United States Patent
Chang

(10) Patent No.: US 10,801,145 B2
(45) Date of Patent: Oct. 13, 2020

(54) SCREW CONVEYOR BASED FABRIC DYEING MACHINE

(71) Applicant: Chi-Lung Chang, Taoyuan (TW)

(72) Inventor: Chi-Lung Chang, Taoyuan (TW)

(*) Notice: Subject to any disclaimer, the term of this patent is extended or adjusted under 35 U.S.C. 154(b) by 144 days.

(21) Appl. No.: 16/180,023

(22) Filed: Nov. 5, 2018

(65) Prior Publication Data
US 2020/0141037 A1 May 7, 2020

(51) Int. Cl.
*D06B 3/36* (2006.01)
*B65G 33/02* (2006.01)
*D06B 5/22* (2006.01)
*D06B 3/20* (2006.01)
*B65G 33/26* (2006.01)

(52) U.S. Cl.
CPC .............. *D06B 3/36* (2013.01); *B65G 33/02* (2013.01); *B65G 33/265* (2013.01); *D06B 3/20* (2013.01); *D06B 5/22* (2013.01)

(58) Field of Classification Search
CPC ........ B65G 33/02; B65G 33/265; D06B 5/22; D06B 3/20; D06B 3/24; D06B 3/34; D06B 3/36; D06B 1/00
See application file for complete search history.

(56) References Cited

U.S. PATENT DOCUMENTS

| | | | |
|---|---|---|---|
| 3,242,702 A * | 3/1966 | Fleissner | D06B 1/00 68/5 E |
| 3,686,902 A * | 8/1972 | Fleissner | F26B 25/008 68/5 D |
| 3,835,490 A * | 9/1974 | Fleissner | D06B 19/0041 8/149.1 |
| 4,019,351 A * | 4/1977 | Mizutani | D06B 3/28 68/177 |
| 4,210,005 A * | 7/1980 | Trullas | D06B 19/0088 68/148 |
| 4,489,575 A * | 12/1984 | Arashi | D06B 19/0094 68/177 |
| 5,850,651 A * | 12/1998 | Ishimaru | D06B 3/28 8/152 |
| 5,960,650 A * | 10/1999 | Chi-Lung | D06B 23/04 68/177 |
| 2015/0308027 A1* | 10/2015 | Chang | D06B 3/24 68/175 |
| 2015/0337471 A1* | 11/2015 | Chang | D06B 3/28 68/18 F |
| 2015/0337472 A1* | 11/2015 | Chang | D06B 3/28 68/12.07 |

* cited by examiner

*Primary Examiner* — David G Cormier
(74) *Attorney, Agent, or Firm* — Leong C. Lei

(57) ABSTRACT

A screw conveyor based fabric dyeing machine including a machine body inside which a screw conveyor including a conveying screw and a fabric support board is arranged and generally parallel to an extension direction of the machine body. Fabric moves through a dyeing tube arranged with the machine body to fall down onto the screw conveyor so that the fabric can be conveyed by the screw conveyor forward through the machine body to reach a guide roller and a nozzle to complete a cycle of circulation for subsequently re-entering the dyeing tube to be dyed therein. As such, water consumption can be reduced and dyeing performance is enhanced, achieving energy saving and carbon reduction, reducing contamination to the surroundings, and realizing green economy.

8 Claims, 2 Drawing Sheets

SCREW CONVEYOR BASED FABRIC DYEING MACHINE

TECHNICAL FIELD OF THE INVENTION

The present invention relates generally to a dyeing machine for dyeing fabrics, and more particularly to a dyeing machine that includes a screw conveyor to achieve circulation of fabric in order to greatly reduce water consumption and improve dyeing efficiency.

DESCRIPTION OF THE PRIOR ART

A fabric dyeing process carried out with a conventional fabric dyeing machine is conducted by using a pump to pressurize dyeing liquid that is subjected to temperature rise or drop by means of a heat exchanger to subsequently get into a nozzle to generate a hydraulic power through jetting or overflowing, and then, the dyeing liquid flows back to a fabric accumulation tank of the dyeing machine. The fabric moves, as being is driven by a guide roller (or no guide roller being involved), into the nozzle and the hydraulic power generated by jetting of overflowing of the dyeing liquid drives the fabric to pass through a dyeing tube to then return back to a dyeing cylinder, in which buoyance and thrust provided by the dyeing liquid advance the fabric to a front end of the machine body for circulation. Meanwhile, the pump also introduces chemical agents, through pumping and pressurization, into the dyeing machine. As such, the dyeing liquid and the fabric move together through the circulation process during which heating, temperature-keeping, and cooling operations and processes achieved with the heat exchanger help make the dye absorbed by the fabric to thereby achieve effects of scouring, dyeing, and rinsing.

SUMMARY OF THE INVENTION

The present invention provides a dyeing machine having a machine body and comprising a dyeing tube and a nozzle and a guide roller arranged inside the machine body. A screw conveyor conveys fabric frontward, as a part of a cycle of circulation, to pass through the guide roller and enter a nozzle to subsequently move through a dyeing tube and interact with dyeing liquid for being dyed. A control box that is operable with a computer program to control operation of the fabric dyeing machine controls operations of the guide roller, the fabric and the conveyor to be synchronization with each other in respect of operation speeds thereof, wherein a fabric circulation sensing idler and/or a fabric movement sensor are operable under the control of the control box, such that when the fabric circulation sensing idler detects the fabric is not moving, the screw conveyor stops operation; and when the fabric movement sensor detects the fabric is moving at an excessively high speed or an excessively low speed or is stuck or jamming, the screw conveyor is controlled to decrease or increase the operation speed or to stop operation. At the same time, detection of an operation speed of the fabric circulation sensing idler can be made to help control, correct, or adjust the speed of circulation of the fabric for synchronization.

The features of the present invention reside on that the machine body of the dyeing machine is provided, in an interior space thereof, with a screw conveyor that is made up of a conveying screw and a fabric support board, wherein fabric is supported and carried on the fabric support board so that the fabric is uniformly and stably conveyed forward by means of rotation of the conveying screw. The number of the conveying screw used can be one or plural. In case of plural conveying screws being used, they are arranged parallel to each other.

In an illustrative embodiment of the present invention, the fabric support board of the screw conveyor is arranged on two opposite sides of the conveying screw in a direction perpendicular to an axial direction of the conveying screw and is mounted in a securely fixed manner or a movable manner In an embodiment of the present invention, a liquid accumulation tank is arranged at a relatively low portion of a bottom of the machine body of the dyeing machine to collect all or a majority of dyeing liquid that falls downward back to the machine body to reduce the amount of water consumed. A filter device and a heat exchanger may be arranged in the liquid accumulation tank so that the dyeing liquid falling back onto the bottom of the machine body may flow into the liquid accumulation tank to be filtered and recovered for further circulation and performance of heat exchange can be improved.

The present invention may also be arranged at a relatively low portion of the machine body of the dyeing machine to provide assistance for forwarding the fabric so that the conveyance or forwarding of the fabric is achieved with the buoyance and thrush of the liquid and also the conveyor.

Compared to a known fabric dyeing machine, the present invention allows fabric to be more uniformly arranged, piled, and conveyed inside the dyeing machine so that the circulative conveyance of the fabric is made more stable, and consumption of water, electrical power, steam, and chemical agents can be greatly reduced and exhaust of waste water and $CO_2$ can be reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
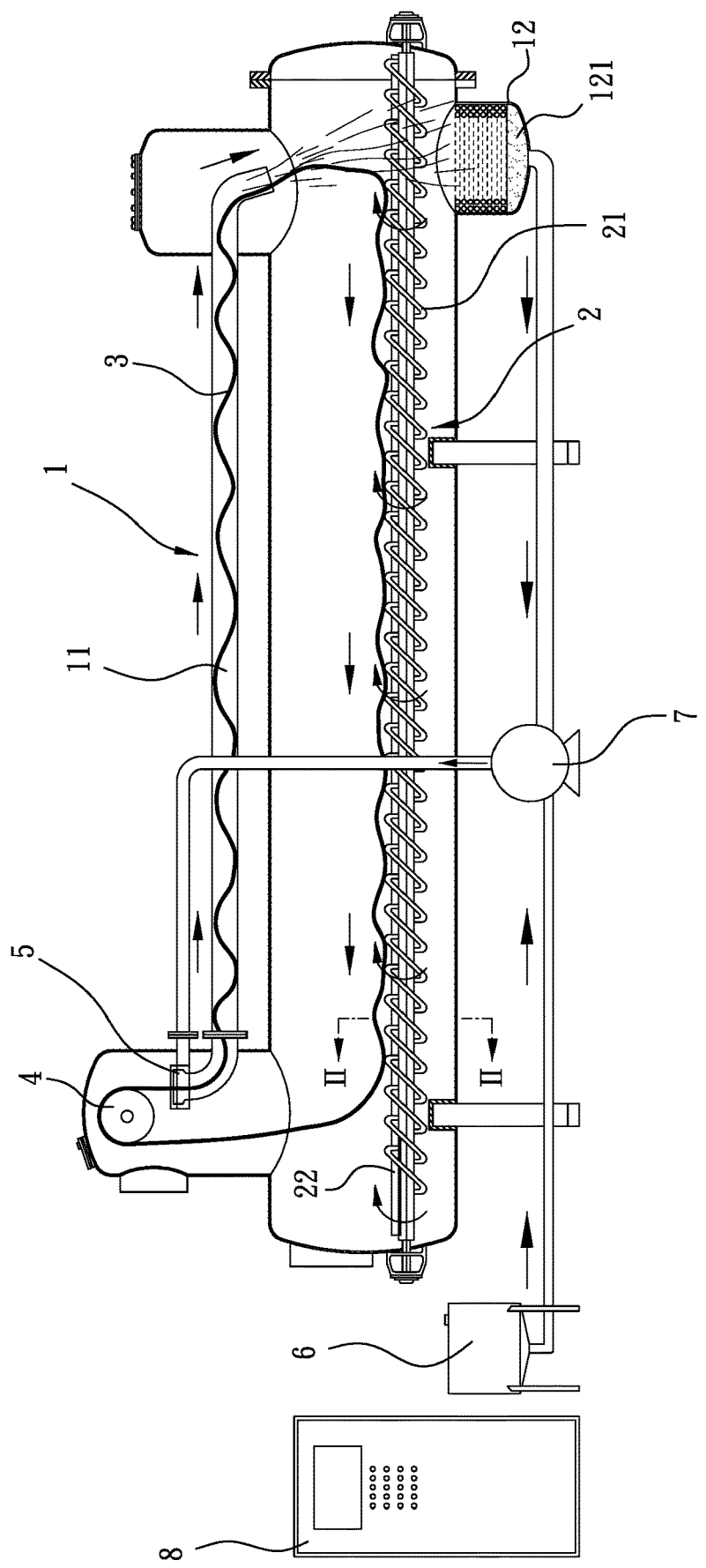
FIG. 1 is a schematic view showing a structure of a dyeing machine according to the present invention.
Figure 2:
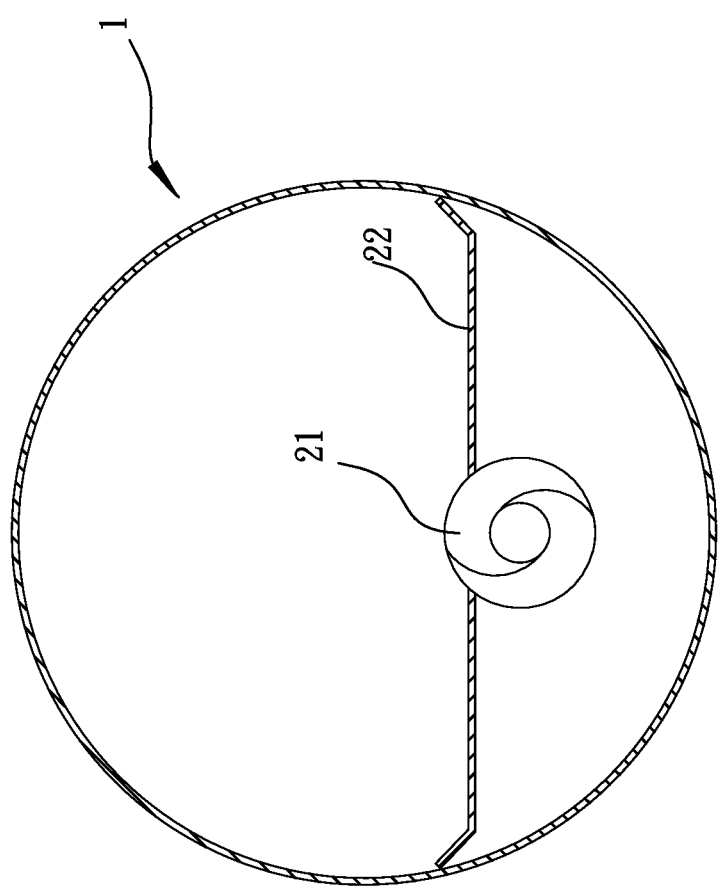
FIG. 2 is a cross-sectional view taken along line II-II of FIG. 1.

As shown in FIGS. 1 and 2, the present invention provides a screw conveyor based fabric dyeing machine, which comprises a machine body 1 having an interior space in a lower portion and also having an upper portion comprising a dyeing tube 11 through which fabric 3 is movable. The machine body 1 has a front end above which a nozzle 5 and a guide roller 4 are arranged in an extended part of the machine body. If desired, a fabric circulation sensing idler (not shown) can be selectively arranged under the guide roller 4. A screw conveyor 2 is arranged in the interior of the machine body and thus at a location below the dyeing tube 11. The screw conveyor 2 comprises one or more conveying screws 21 and a fabric support board 22. In an example, one single conveying screw 21 is provided, while in another example, multiple conveying screws are provided. In the case that multiple conveying screws 21 are provided, they are preferably arranged parallel to each other. The conveying screws 21 can be all connected to a power system (not shown) or only some of the conveying screws are connected to the power system so that the conveying screws can be driven to rotate. In the embodiment illustrated, one conveying screw is provided and the fabric support board 22 comprises two sections that are arranged on two opposite sides of the conveying screw 21 in a direction that is perpendicular to an axial direction of the conveying screw. The fabric support board 22 can be arranged in a securely fixed manner or a movable manner of for example moving with the fabric or other ways of movability.

In addition to the front end, the machine body 1 has an opposite rear end. The machine body 1 can be set in an inclined manner so as to incline toward either the front end or the rear end. A liquid accumulation tank 12 is provided at one of the front end or rear end, depending on the direction of inclination of the machine body 1, and in the embodiment illustrated, the liquid accumulation tank is provided at the rear end. The liquid accumulation tank 12 has a bottom on which a filter 121 and a heat exchanger may be mounted and connected through piping to the nozzle 5. The piping is provided with a pump 7, and the pump 7 is further connected through piping to a chemical agent tank 6 to receive a chemical agent stored in the chemical agent tank.

The operation of this invention is as follows. Fabric 3 is fed into the machine body 1 and is then driven by the guide roller 4 that is located at the front end to move into the nozzle 5 for being further driven and advancing into and moving through the dyeing tube 11 in a direction toward the rear end to then fall down, at the rear end of the machine body, to the conveying screw 21 and the fabric support board 22 of the screw conveyor 2, so as to be conveyed, through rotation of the conveying screw 21, to the front end of the machine body to complete a cycle of circulation. Meanwhile, the pump 7 draws and pumps the dyeing liquid that is accumulated in the liquid accumulation tank 12 through the piping to the nozzle 5 where the dyeing liquid is jetted to push or cause movement of the fabric 3 through the dyeing tube toward the rear end, wherein the dyeing liquid interacts with the fabric 3 inside both the nozzle 5 and the dyeing tube 11 to achieve an effect of dyeing of the fabric. The dyeing liquid flows down at the rear end of the dyeing tube 11 to drop onto the bottom of the machine body, where a majority of the dyeing liquid falls directly into the liquid accumulation tank 12, while a remaining portion of the dyeing liquid that may drop to the bottom of the main body flows along the inclined bottom of the main body to get into the liquid accumulation tank 12. The dyeing liquid is then pumped, again, by the pump 7 to jet from the nozzle 5 and move through the dyeing tube 11 to fall back into the machine body 1 to complete circulation of the dyeing liquid.

The guide roller 4 and the conveying screw 21 may be operated at respective operation speeds that are preferably controlled by a control box 8 so that they are in synchronization with a circulation speed of the fabric 3. These speeds are adjustable. With the arrangement of the control box 8 to control the speeds, during the movement of conveyance of the fabric 3, when it is detected that the fabric is not being conveyed to move forward or the fabric is conveyed forward with an excessively fast or excessively slow speed, the control box 8 may control the conveying screw 21 to stop operation or to increase or decrease the operation speed thereof.

In summary, this invention uses a screw conveyor as an additional or alternative measure of the hydraulic force of dyeing liquid to drive movement and circulation of the fabric, wherein the fabric is supported on the fabric support board 22 and is uniformly and stably conveyed forward through rotation of the conveying screw 21. In addition, computer-based or program-based controlling, which can be carried out in or with the control box, is adopted to provide control by which the fabric 3, the guide roller 4, and the screw conveyor 2 are operated with respective speeds that are set in synchronization with one another. In addition, in abnormality of the moving speed of the conveyance of the fabric 3, adjustment or regulation can be carried out or the machine can be just shut down in order to protect the fabric 3 from being damaged by the improper conveyance speed and also to ensure the machine is free of damages.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A screw conveyor based fabric dyeing machine, comprising a machine body that comprises a dyeing tube and also comprises a nozzle and a guide roller arranged therein, the machine body has a bottom that is connected through a pump to the nozzle so that the pump draws and drives a dyeing liquid from the machine body to the nozzle and the dyeing tube to carry out dyeing of fabric, the dyeing liquid subsequently flowing and falling directly down to the bottom of the machine body, wherein the machine body comprises a screw conveyor arranged inside the machine body and comprising at least one conveying screw and a fabric support board for driving or assisting movement of the fabric; and wherein the conveying screw is spaced from two opposite sidewalls of the machine body and the fabric support board comprises two sections that are respectively arranged at two opposite sides of the at least one conveying screw in a direction perpendicular to an axial direction of the at least one conveying screw and are located in the spacings between the conveying screw and the two opposite sidewalls of the machine body, the two sections of the fabric support board being arranged between the at least one conveying screw and two opposite sidewalls of the machine body to each define a planar surface between the at least one conveying screw and the sidewalls of the machine body.

2. The screw conveyor based fabric dyeing machine according to claim 1, wherein the screw conveyor comprises a single conveying screw or multiple conveying screws.

3. The screw conveyor based fabric dyeing machine according to claim 1, wherein the fabric support board is mounted in a securely fixed manner.

4. The screw conveyor based fabric dyeing machine according to claim 1, wherein the fabric support board is mounted in a manner of being movable with the fabric.

5. The screw conveyor based fabric dyeing machine according to claim 1, wherein the bottom of the machine body has a relatively low portion where a liquid accumulation tank is mounted to collect all or a majority of the dyeing liquid falling down from the dyeing tube.

6. The screw conveyor based fabric dyeing machine according to claim 2, wherein the fabric support board is mounted in a securely fixed manner.

7. The screw conveyor based fabric dyeing machine according to claim 2, wherein the fabric support board is mounted in a manner of being movable with the fabric.

8. The screw conveyor based fabric dyeing machine according to claim 2, wherein the bottom of the machine body has a relatively low portion where a liquid accumulation tank is mounted to collect all or a majority of the dyeing liquid falling down from the dyeing tube.

\* \* \* \* \*